United States Patent
Lyons (10) Patent No.: US 12,404,789 B1
(45) Date of Patent: Sep. 2, 2025

(54) DIESEL EXHAUST FLUID COOLING SYSTEM

(71) Applicant: International Engine Intellectual Property Company, LLC, Lisle, IL (US)

(72) Inventor: Timothy M. Lyons, Batavia, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 18/587,337

(22) Filed: Feb. 26, 2024

(51) Int. Cl.
 *F01M 13/04* (2006.01)
 *F01M 13/00* (2006.01)
 *F01M 13/02* (2006.01)

(52) U.S. Cl.
 CPC ..... *F01M 13/04* (2013.01); *F01M 2013/0038* (2013.01); *F01M 2013/026* (2013.01); *F01M 2013/0411* (2013.01); *F01N 2610/02* (2013.01)

(58) Field of Classification Search
 CPC .................. F01M 13/00; F01M 13/04; F01M 2013/0038; F01M 2013/026; F01M 2013/0411; F01N 2610/02; F01N 2610/10; B01D 2251/2062; B01D 2251/2067
 See application file for complete search history.

(56) References Cited

U.S. PATENT DOCUMENTS

| | | | |
|---|---|---|---|
| 2,057,001 A * | 10/1936 | Bogdany | F01M 13/04 123/573 |
| 2,762,349 A | 9/1956 | Malcolm | |
| 2,771,065 A | 11/1956 | Malcolm | |
| 2,818,052 A | 12/1957 | Trainer, Jr. | |
| 2,902,012 A | 9/1959 | Malcolm | |
| 4,050,237 A * | 9/1977 | Pall | B01D 46/0031 55/486 |
| 4,768,493 A * | 9/1988 | Ohtaka | F01M 13/00 123/573 |
| 5,878,731 A * | 3/1999 | Bedkowski | F01M 13/04 123/573 |
| 6,752,856 B1 * | 6/2004 | Graze, Jr. | B01D 50/20 55/DIG. 19 |
| 7,752,840 B2 | 7/2010 | Stewart | |
| 8,434,434 B2 | 5/2013 | Adelman et al. | |
| 8,485,145 B2 | 7/2013 | Palumbo | |
| 10,287,943 B1 | 5/2019 | Schlitz | |
| 2005/0092309 A1 * | 5/2005 | Bedkowski | F02M 25/06 123/572 |

(Continued)

FOREIGN PATENT DOCUMENTS

| | | |
|---|---|---|
| CN | 109715926 | 5/2019 |
| DE | 112021003669 | 7/2023 |

(Continued)

Primary Examiner — John M Zaleskas
(74) Attorney, Agent, or Firm — Umang Khanna (57) ABSTRACT

A vehicle includes a diesel engine having a crankcase and a crankcase ventilation system connected to the crankcase and configured to ventilate crankcase exhaust gases. The vehicle also includes a diesel exhaust fluid (DEF) reservoir including DEF therein, the DEF configured to reduce emissions of the diesel engine, and a DEF cooling system operably connected to the crankcase and the DEF reservoir. The DEF cooling system is configured to receive the DEF and use the DEF to cool the crankcase exhaust gases passing therethrough.

19 Claims, 5 Drawing Sheets

(56) References Cited

U.S. PATENT DOCUMENTS

| | | | |
|---|---|---|---|
| 2009/0199794 A1* | 8/2009 | Slaughter | F01M 13/04 |
| | | | 123/41.86 |
| 2011/0083625 A1 | 4/2011 | Lyons | |
| 2015/0231564 A1* | 8/2015 | Wittrock | F01N 3/2066 |
| | | | 422/171 |
| 2015/0231565 A1* | 8/2015 | Wittrock | F01N 13/009 |
| | | | 423/212 |
| 2016/0025048 A1* | 1/2016 | Shiota | F02M 26/06 |
| | | | 60/599 |
| 2017/0030247 A1* | 2/2017 | Suetou | F01N 3/08 |
| 2019/0242327 A1* | 8/2019 | Stanley | F02F 1/242 |
| 2020/0217230 A1* | 7/2020 | Hase | F02M 35/162 |
| 2021/0262372 A1* | 8/2021 | Hogan | B01D 53/9431 |
| 2022/0090548 A1* | 3/2022 | Wolk | F02D 41/3011 |
| 2023/0086242 A1* | 3/2023 | Scarf | F01M 13/028 |
| | | | 60/605.1 |

FOREIGN PATENT DOCUMENTS

| | | | |
|---|---|---|---|
| JP | 2017141766 A | * | 8/2017 |
| JP | 2020026763 A | * | 2/2020 |
| WO | WO-2019186968 A1 | * | 10/2019 |

\* cited by examiner

DIESEL EXHAUST FLUID COOLING SYSTEM

BACKGROUND

This disclosure relates to a diesel engine system. Particularly, this disclosure relates to a system for removing particulates from crankcase exhaust gases to reduce emissions and improve engine performance.

RELATED ART

Modern day legislative requirements to reduce emissions have effectively required diesel engine systems to include a closed crankcase ventilation system to process the crankcase exhaust gases. Crankcase exhaust gases, commonly referred to as "blow-by," are the gases that are forced out of the crankcase during engine operation. Blow-by is a mixture of several components, including oil aerosol, soot particles, water vapor, hydrocarbons, and aldehydes. It was once common to include breathers equipped with road tubes to expel all of these components to the atmosphere. Nowadays, with closed crankcase ventilation systems, these components must be filtered out before recirculating the crankcase exhaust into the engine. Otherwise, any oil aerosols, or other particulates, can buildup on the housing and various other surfaces of the compressor stage of the turbocharger, which will eventually degrade the operation of the compressor and hinder engine performance.

Crankcase ventilation systems perform the functions of filtering, collecting oil, and pressure regulation for regulating the pressure within the crankcase. Closed crankcase ventilation systems generally include a housing with an exhaust gas inlet and outlet, a pressure regulator, one or more filters disposed within the housing for capturing the various particulates suspended in the crankcase exhaust, and an outlet valve for the removal of the captured components. The filters perform the tasks of coalescing and separating the unwanted components, e.g., the oil mist particles, soot, and liquid volatiles created during the combustion process. The housing can serve as a sump chamber to collect liquid oil, which may be subsequently recirculated out through the outlet valve and back into the crankcase. However, despite improvements in crankcase ventilation systems, it can still be difficult to capture vapors and other particulates. Over time, these uncaptured particles will persist in collecting on the surfaces of the turbocharger compressor stage resulting in loss of compressor efficiency, damage, and reduced engine performance.

SUMMARY

According to one embodiment, a vehicle includes a diesel engine having a crankcase and a crankcase ventilation system connected to the crankcase and configured to ventilate crankcase exhaust gases. The vehicle also includes a diesel exhaust fluid (DEF) reservoir including DEF therein, the DEF configured to reduce emissions of the diesel engine, and a DEF cooling system operably connected to the crankcase and the DEF reservoir. The DEF cooling system is configured to receive the DEF and use the DEF to cool the crankcase exhaust gases passing therethrough.

According to another embodiment, a diesel engine system includes a diesel engine having a crankcase and a crankcase ventilation system connected to the crankcase and configured to ventilate crankcase exhaust gases. The diesel engine system further includes a diesel exhaust fluid (DEF) reservoir including DEF therein, the DEF configured to reduce emissions of the diesel engine, and a DEF cooling system operably connected to the crankcase and the DEF reservoir. The DEF cooling system configured to receive the DEF and use the DEF to cool the crankcase exhaust gases passing therethrough.

According to yet another embodiment, a method for reducing emissions of a diesel engine includes several steps. The method includes an initial step of providing a diesel engine having a crankcase, a crankcase ventilation system connected to the crankcase, a diesel exhaust fluid (DEF) reservoir including DEF therein, the DEF configured to reduce emissions of the diesel engine, and a DEF cooling system operably connected to the crankcase and the DEF reservoir. The method further includes a step of ventilating, by the crankcase ventilation system, crankcase exhaust gases exiting from the crankcase. The method further includes a step of supplying the DEF to the DEF cooling system. The method further includes a step of cooling the crankcase exhaust gases, by the DEF cooling system, to condense vapors in the crankcase exhaust gases passing through the DEF cooling system so that the crankcase ventilation system filters particulate matter out of the crankcase exhaust gases to further reduce emissions of the diesel engine.

DETAILED DESCRIPTION

Embodiments described herein relate to arrangements, and method of implementing, of a vehicle engine system for efficiently cooling crankcase exhaust gases with diesel exhaust fluid to further reduce emissions of the engine and prevent a buildup of particulate matter on engine components. The apparatus and method may be applied to various types of engine systems, including engine systems of generators, unmanned vehicles, submarines, or vehicles, including passenger vehicles, commercial vehicles, and recreational vehicles, such as highway or semi-tractors, straight trucks, buses, fire trucks, motorhomes, and etcetera. It is contemplated that the apparatus and method may be applied to vehicles having drivetrains including a diesel, gasoline, or gaseous fuel engine, as well as to vehicles having hybrid electric drivetrains. It is further contemplated that the apparatus and method may be applied to vehicles having manual transmissions, automatic transmissions, automated manual transmissions, continuously variable transmissions, hybrid electric transmissions, and hydraulic transmissions, as non-limiting examples. It is further contemplated that the apparatus and method may be applied to autonomous or semi-autonomous vehicles.

Figure 1:
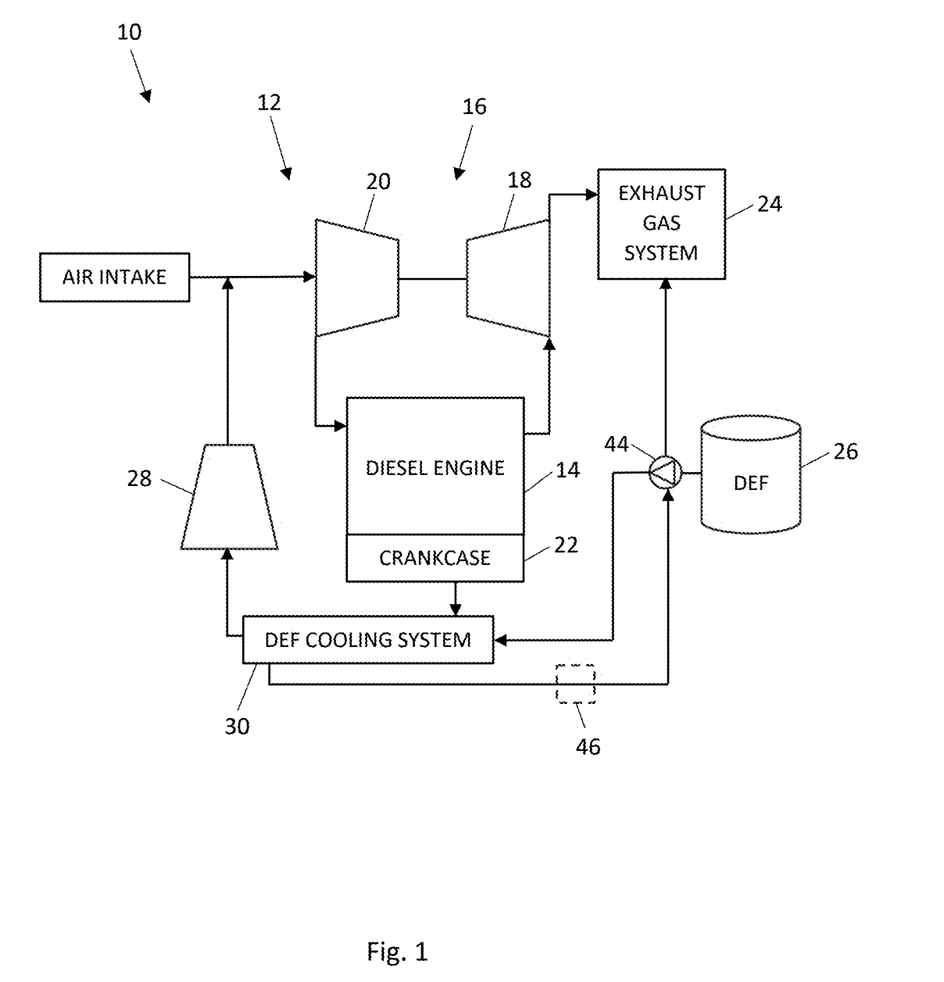
FIG. 1 is a graphical representation of a diesel exhaust fluid cooling system for cooling the crankcase gases or "blow-by" gases.
Figure 2:
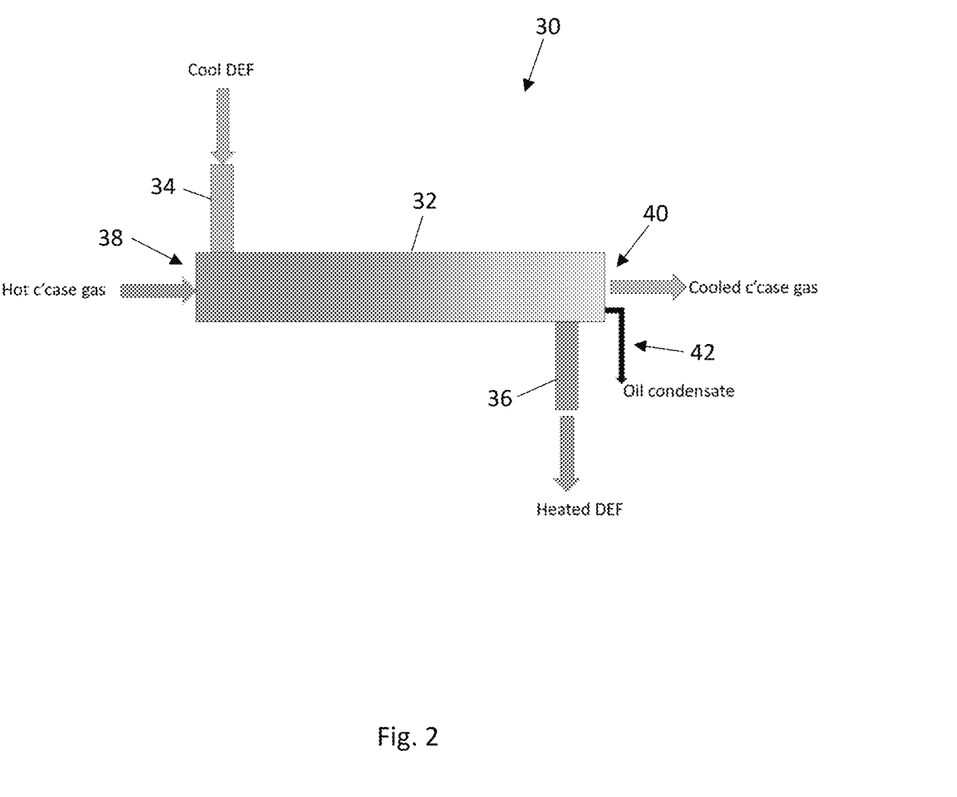
FIG. 2 is a graphical representation illustrating how the diesel exhaust fluid, acting as a working fluid, cools the crankcase exhaust gases.

Turning now to FIGS. 1 and 2, a vehicle 10 implementing an embodiment of the present diesel engine system 12 is shown. The vehicle 10 can be in the form of a tow vehicle 10 for transporting a payload. For instance, the vehicle 10 can be a class 8 truck, capable of towing a trailer attached thereto, that is driven by the diesel engine system 12. The diesel engine system 12 generally includes a diesel engine 14, a turbocharger 16 with a turbine 18 and a compressor 20, a crankcase 22, an exhaust gas system 24, e.g., an after-treatment system 24, which utilizes diesel exhaust fluid (DEF), stored in a DEF reservoir 26, to treat and reduce emissions of the exhaust gases, a crankcase ventilation system 28, and a DEF cooling system 30 for cooling crankcase exhaust gases to further reduce emissions and a buildup of particulate matter on engine components.

A common issue with closed crankcase ventilation systems is the buildup of particulate matter, such as oil and soot, in the engine components, such as within the ventilation system itself and/or on various surfaces in the turbocharger compressor stage. Over time, the accumulation of these deposits contributes to a loss of compressor efficiency and generally degrades engine performance. This issue is exacerbated by the difficulty of removing the various vapors suspended in the hot crankcase exhaust gases. To help assist in removing the vapors, such as oil aerosol particulates, the DEF cooling system 30 is designed to cause the condensation of the vapors, which thereby makes the condensed particulate matter far easier to remove. The particulate matter can be removed by the DEF cooling system 30 and/or by the crankcase ventilation system 28. Thus, the DEF cooling system 30 is configured to cool the crankcase exhaust gases and condense oil aerosol particulates to reduce emissions and a buildup of particulate matter on the compressor 20 to prevent compressor degradation caused by the buildup of particulate matter on the compressor 20.

The exhaust gas aftertreatment system 24 is configured to treat the exhaust of the diesel engine 14 for reducing the emissions thereof. The exhaust gas aftertreatment system 24 can include a catalytic reduction system including one or more diesel oxidation catalysts (DOCs), diesel particulate filters (DPFs), selective catalytic reduction (SCR) catalysts, a DEF injector for injecting the DEF, which can be ammonia or a urea solution, and various sensors for monitoring the exhaust gases.

The crankcase ventilation system 28 is operably connected to the crankcase 22 and is configured to ventilate crankcase exhaust gases. The crankcase ventilation system 28 may generally include a housing with an inlet and an outlet, a pressure regulator, one or more filters, and a drain valve. In some embodiments, the crankcase ventilation system 28 can be a closed system. In some embodiments, the crankcase ventilation system 28 can be open and vent to the atmosphere.

The DEF cooling system 30 is operably connected to the crankcase 22 and the DEF reservoir 26. As shown, the DEF cooling system 30 is operationally connected in between the crankcase 22 and the crankcase ventilation system 28. The DEF cooling system 30 is configured to receive the DEF and use the DEF to cool the crankcase exhaust gases passing therethrough. More particularly, the DEF cooling system 30 is configured for condensing various vapors in the crankcase exhaust gases, such as oil aerosol particulates, thus allowing the crankcase ventilation system 28 to more efficiently and easily filter particulate matter out of the crankcase exhaust gases.

As shown in FIG. 2, the DEF cooling system 30 can include a housing 32 wherein the heat transfer from the crankcase gases to the DEF occurs. The housing 32 can include inlets and outlets 34, 36, 38, 40 for the DEF and crankcase exhaust gases, respectively, and an oil condensate outlet 42 which allows oil and other particulate matter to exit therethrough. In some embodiments, the collected oil may be returned to the crankcase 22 via a return line.

In operation, hot crankcase gases, with oil aerosol therein, enter the DEF cooling system 30 at one end thereof. A DEF pump 44 will supply the DEF to the DEF cooling system 30. As the crankcase gases pass through the DEF cooling system 30, the cooler DEF receives the heat from the hot crankcase gases and accordingly cools the crankcase gasses enough for causing the condensation of the oil aerosol. Thereafter, the now-condensed oil, which can be in liquid form, can exit through the outlet 42 and/or continue onto the crankcase ventilation system 28 for the capture and removal thereof. The heated DEF will return to the DEF reservoir 26.

In one embodiment, the DEF cooling system 30 can include a housing, an internal chamber, and one or more DEF fluid passageways disposed within the housing, thus allowing the hot crankcase exhaust gases to flow through the housing and around the DEF fluid passageways to accordingly cool the crankcase exhaust gases. In another embodiment, the DEF cooling system 30 can comprise a plurality of fins which additionally help to cool the crankcase exhaust gases as the gases pass therearound. In another embodiment, the DEF cooling system 30 can comprise one or more fluid passageways for the crankcase exhaust which are submerged in a reservoir of DEF within the housing of the DEF cooling system 30.

In one embodiment, the DEF pump 44 is configured as a dual purpose pump for dually supplying DEF to the exhaust gas treatment system 24 and the DEF cooling system 30. Hence, the single pump 44 is fluidly connected to the DEF reservoir 26 and configured to supply the DEF to the exhaust gas system 24 and the DEF cooling system 30. In another embodiment, two or more pumps can separately supply the DEF fluid to the exhaust gas treatment system 24 and the DEF cooling system 30.

Optionally, in some embodiments, the DEF cooling system 30 can further include a heat exchanger 46 in the return line for cooling the DEF before it returns to the DEF reservoir 26 by the pump (as shown in phantom in FIG. 1). The heat exchanger 46 can be in the form of any desired heat exchanger.

Figure 3:
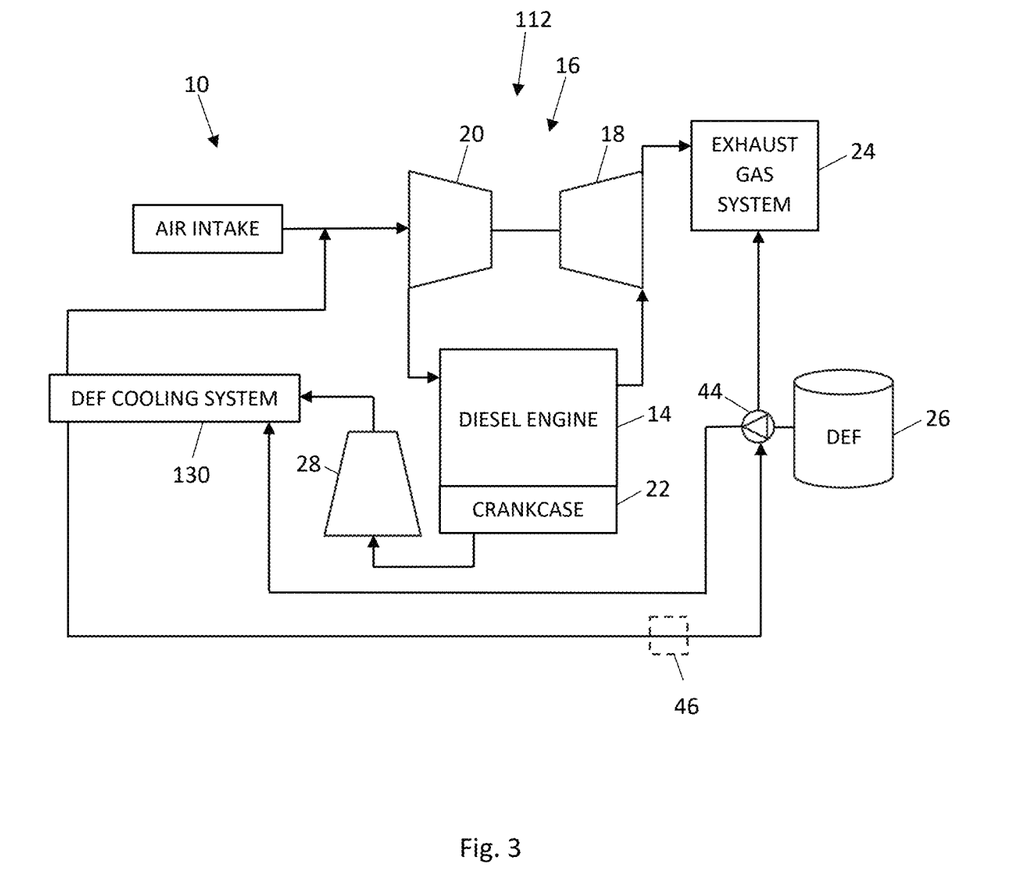
FIG. 3 is a graphical representation of another embodiment of a diesel exhaust fluid cooling system, wherein the cooling system is positioned downstream of the crankcase ventilation system.

Referring now to FIG. 3, there is shown another embodiment of a diesel engine system 112. The diesel engine system 112 can be substantially similar to the diesel engine system 12 as discussed above except that the DEF cooling system 130 is operationally located at the compressor stage, after the crankcase ventilation system 28. In other words, the DEF cooling system 130 is operationally connected in between the crankcase ventilation system 28 and the compressor 20.

Figure 4:
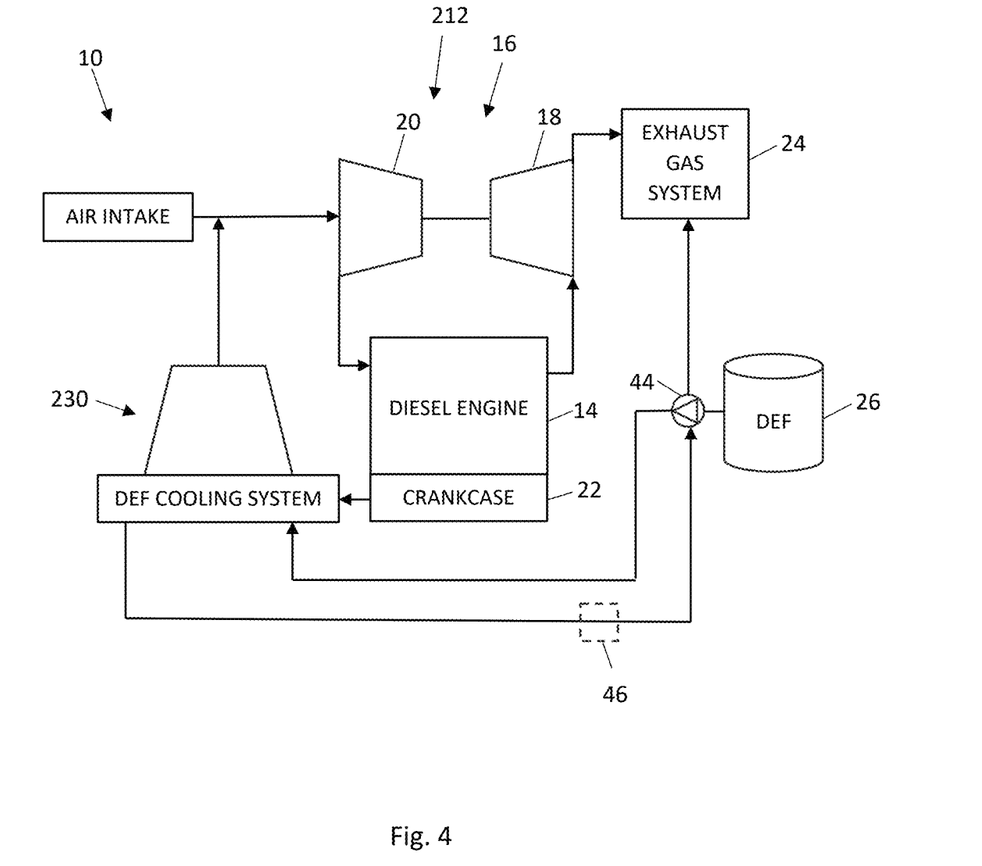
FIG. 4 is a graphical representation of another embodiment of a diesel exhaust fluid cooling system, wherein the cooling system is integrated into the crankcase ventilation system as a single unit.

Referring now to FIG. 4, there is shown another embodiment of a diesel engine system 212. The diesel engine system 212 can be substantially similar to the diesel engine system 12 as discussed above except that the DEF cooling system 30 is integrated into the crankcase ventilation system 28 as one crankcase ventilation and cooling system 230.

Figure 5:
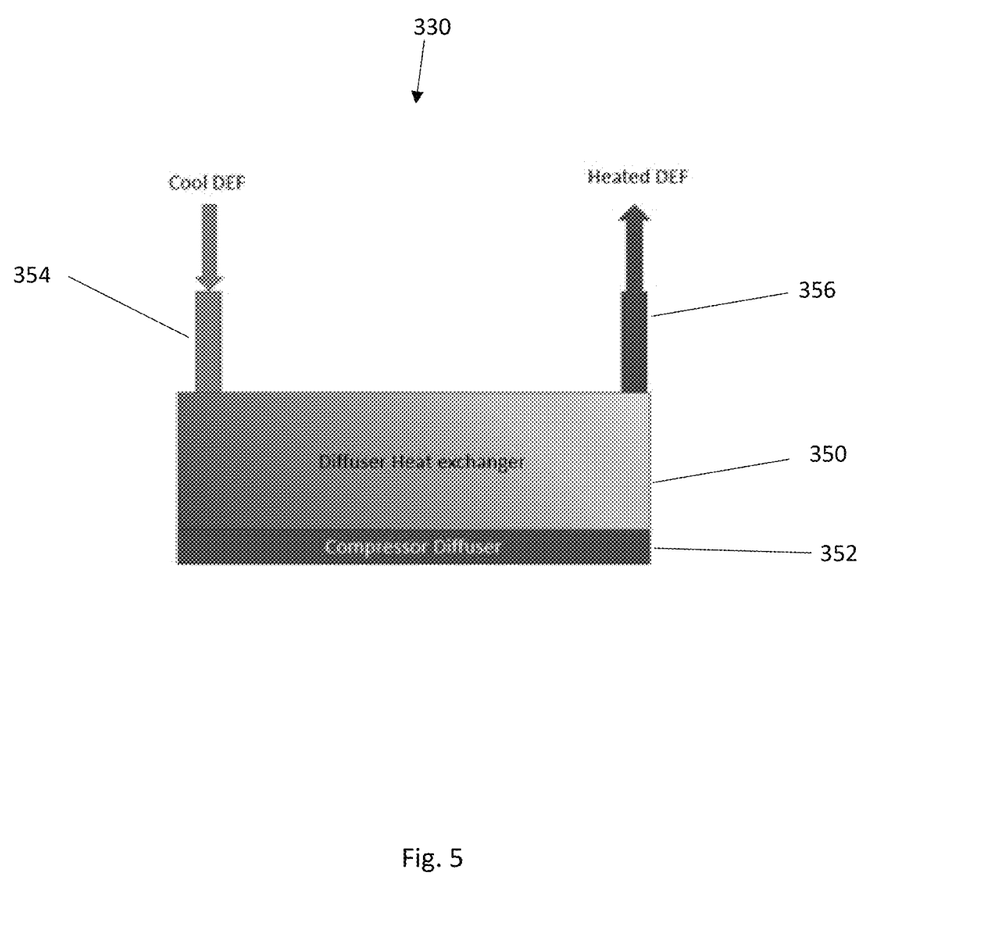
FIG. 5 is a graphical representation of another embodiment of a diesel exhaust fluid cooling system, wherein the cooling system transfers heat from the turbocharger compressor stage to the DEF.

Turning now to FIG. 5, there is shown another embodiment of a DEF cooling system 330. The embodiment of the DEF cooling system shown in FIG. 5 may be used in combination with any of the embodiments of DEF cooling systems described previously herein, or may be used independently from any of the embodiments of the DEF cooling systems described previously herein. The embodiment of the DEF cooling system 330 shown in FIG. 5 is provided with a diffuser heat exchanger 350 that adjoins the compressor diffuser 352 of the compressor (not shown) of a turbocharger (not shown) of a diesel engine system. The diffuser heat exchanger 350 is provided with a DEF inlet 354 and a DEF outlet 356, and acts as a heat exchanger between the compressor diffuser 352 and the DEF. In this way, the embodiment of the DEF cooling system 330 shown in FIG. 5 utilizes the DEF as a working fluid to transfer heat from the compressor of the turbocharger to the DEF storage tank (not shown).

In so doing, the temperature of any oil mist particles, soot, or liquid volatiles will be kept below the coking temperature of the oil and oil additives. Moreover, since the DEF is at a lower temperature than the engine coolant, no secondary coolant loop is necessary to accomplish effective heat transfer. In addition, such vehicles already have a DEF pump that, with slight modifications, can be used to pump the working fluid of the present invention. Nevertheless, if needed, a heat exchanger may added in the DEF loop to control temperature of the DEF returning to the DEF tank.

While illustrative arrangements, and control logic therefor, implementing the engine system have been described with respect to at least one embodiment, the arrangements and methods can be further modified within the spirit and scope of this disclosure, as demonstrated previously. This application is therefore intended to cover any variations, uses, or adaptations of the arrangement and method using its general principles. Further, this application is intended to cover such departures from the present disclosure as come within known or customary practice in the art to which the disclosure pertains and which fall within the limits of the appended claims.

What is claimed is:

1. A vehicle, comprising:
   a diesel engine having a crankcase;
   a crankcase ventilation system downstream of the crankcase and configured to ventilate crankcase exhaust gases;
   a diesel exhaust fluid (DEF) reservoir including DEF therein, the DEF configured to reduce emissions of the diesel engine;
   a DEF cooling system operably connected to the crankcase and the DEF reservoir, the DEF cooling system configured to receive the DEF and use the DEF to cool the crankcase exhaust gases passing there through;
   a turbocharger with a compressor connected to the diesel engine, the compressor receiving intake air and recirculated crankcase exhaust gases; and
   a DEF heat exchanger adjoining the compressor of the turbocharger, the DEF heat exchanger configured to receive the DEF and use the DEF to cool the compressor of the turbocharger.

2. The vehicle of claim 1, wherein:
   the DEF cooling system is configured to cool the crankcase exhaust gases and condense vapors therein, allowing the crankcase ventilation system to filter particulate matter out of the crankcase exhaust gases.

3. The vehicle of claim 1, wherein:
   the DEF heat exchanger further comprises a diffuser heat exchanger that adjoins a diffuser of the compressor of the turbocharger.

4. The vehicle of claim 1, wherein:
   the DEF cooling system is configured to cool the crankcase exhaust gases and condense oil aerosol particulates to reduce emissions and a buildup of particulate matter on the compressor to prevent compressor degradation otherwise caused by the buildup of particulate matter on the compressor.

5. The vehicle of claim 4, wherein:
   the DEF cooling system is operationally connected in between the crankcase ventilation system and the compressor.

6. The vehicle of claim 1, wherein:
   the DEF cooling system is operationally connected in between the crankcase and the crankcase ventilation system.

7. The vehicle of claim 1, wherein:
   the DEF cooling system is integrated into the crankcase ventilation system.

8. The vehicle of claim 1, further comprising:
   a DEF pump fluidly connected to the DEF reservoir and configured to supply the DEF to an exhaust gas system and the DEF cooling system.

9. The vehicle of claim 8, wherein:
   the DEF cooling system further comprises a heat exchanger configured to cool the DEF before the DEF is returned to the DEF reservoir by the DEF pump.

10. A diesel engine system, comprising:
    a diesel engine having a crankcase;
    a crankcase ventilation system downstream of the crankcase and configured to ventilate crankcase exhaust gases;
    a diesel exhaust fluid (DEF) reservoir including DEF therein, the DEF configured to reduce emissions of the diesel engine; and
    a DEF cooling system operably connected to the crankcase and the DEF reservoir, the DEF cooling system configured to receive the DEF and use the DEF to cool the crankcase exhaust gases passing there through;
    a turbocharger with a compressor connected to the diesel engine, the compressor receiving intake air and recirculated crankcase exhaust gases; and
    a DEF heat exchanger adjoining the compressor of the turbocharger, the DEF heat exchanger configured to receive the DEF and use the DEF to cool the compressor of the turbocharger.

11. The diesel engine system of claim 10, wherein:
    the DEF cooling system is configured to cool the crankcase exhaust gases and condense vapors therein, allowing the crankcase ventilation system to filter particulate matter out of the crankcase exhaust gases.

12. The diesel engine system of claim 10, wherein:
    the DEF heat exchanger further comprises a diffuser heat exchanger that adjoins a diffuser of the compressor of the turbocharger.

13. The diesel engine system of claim 10, wherein:
    the DEF cooling system is configured to cool the crankcase exhaust gases and condense oil aerosol particulates to reduce emissions and a buildup of particulate matter on the compressor to prevent compressor degradation otherwise caused by the buildup of particulate matter on the compressor.

14. The diesel engine system of claim 13, wherein:
    the DEF cooling system is operationally connected in between the crankcase ventilation system and the compressor.

15. The diesel engine system of claim 10, wherein:
the DEF cooling system is operationally connected in between the crankcase and the crankcase ventilation system.

16. The diesel engine system of claim 10, wherein:
the DEF cooling system is integrated into the crankcase ventilation system.

17. The diesel engine system of claim 10, further comprising:
a DEF pump fluidly connected to the DEF reservoir and configured to supply the DEF to an exhaust gas system and the DEF cooling system.

18. The diesel engine system of claim 17, wherein:
the DEF cooling system further comprises a heat exchanger configured to cool the DEF before the DEF is returned to the DEF reservoir by the DEF pump.

19. A method, comprising:
providing a diesel engine having a crankcase, a crankcase ventilation system downstream of the crankcase, a diesel exhaust fluid (DEF) reservoir including DEF therein, the DEF configured to reduce emissions of the diesel engine, a DEF cooling system operably connected to the crankcase and the DEF reservoir; a turbocharger with a compressor receiving intake air and recirculated crankcase exhaust gases and a DEF heat exchanger adjoining the compressor configured to use the DEF to cool the compressor;

ventilating, by the crankcase ventilation system, crankcase exhaust gases exiting from the crankcase;

supplying the DEF to the DEF cooling system; and cooling the crankcase exhaust gases, by the DEF cooling system, to condense vapors in the crankcase exhaust gases passing through the DEF cooling system so that the crankcase ventilation system filters particulate matter out of the crankcase exhaust gases to further reduce emissions of the diesel engine.

\* \* \* \* \*